US008627092B2

(12) United States Patent
Fischer et al.

(10) Patent No.: US 8,627,092 B2
(45) Date of Patent: Jan. 7, 2014

(54) ASYMMETRIC CRYPTOGRAPHY FOR WIRELESS SYSTEMS

(75) Inventors: Patrick Fischer, Bourg la Reine (FR); Vyacheslav Belenko, Saint-Petersburg (RU)

(73) Assignee: LG Electronics Inc., Seoul (KR)

( * ) Notice: Subject to any disclaimer, the term of this patent is extended or adjusted under 35 U.S.C. 154(b) by 793 days.

(21) Appl. No.: 12/293,806

(22) PCT Filed: Mar. 22, 2007

(86) PCT No.: PCT/KR2007/001412
§ 371 (c)(1),
(2), (4) Date: Sep. 19, 2008

(87) PCT Pub. No.: WO2007/108660
PCT Pub. Date: Sep. 27, 2007

(65) Prior Publication Data
US 2010/0293372 A1    Nov. 18, 2010

Related U.S. Application Data

(60) Provisional application No. 60/795,859, filed on Apr. 27, 2006, provisional application No. 60/785,148, filed on Mar. 22, 2006.

(51) Int. Cl.
*H04L 9/32*    (2006.01)

(52) U.S. Cl.
USPC ....... 713/181; 455/412.2; 455/411; 455/41.2; 455/426.1; 380/247; 380/201; 713/185; 713/169; 713/155; 713/168; 713/193; 713/152; 726/9; 726/2; 370/392; 370/352; 370/401; 370/338; 370/465; 370/252; 705/62; 714/748

(58) Field of Classification Search
USPC ......................................................... 713/181
See application file for complete search history.

(56) References Cited

U.S. PATENT DOCUMENTS

| 6,636,968 | B1 | 10/2003 | Rosner et al. | |
|---|---|---|---|---|
| 6,768,903 | B2 * | 7/2004 | Fauconnier et al. | 455/403 |
| 6,941,457 | B1 | 9/2005 | Gundavelli et al. | |
| 7,289,630 | B2 * | 10/2007 | Vialen et al. | 380/201 |

(Continued)

FOREIGN PATENT DOCUMENTS

| KR | 10-2002-0086232 | 11/2002 |
|---|---|---|
| TW | 583568 | 4/2004 |
| TW | I271079 | 1/2007 |

OTHER PUBLICATIONS

UMTSWorld, Overview of the Universal Mobile Telecommunication System, 2002.*

(Continued)

*Primary Examiner* — Tamara T Kyle
*Assistant Examiner* — Ondrej Vostal
(74) *Attorney, Agent, or Firm* — Lee, Hong, Degerman, Kang & Waimey

(57) ABSTRACT

A method for authenticating messages in a communication network includes forming a super message having a plurality of individual messages such that at least two of the individual messages are intended for separate receiving entities. The method further includes creating a message authentication code (MAC) using a private key, such that the MAC is configured to permit authentication of the super message using a public key.

25 Claims, 9 Drawing Sheets

(56) References Cited

U.S. PATENT DOCUMENTS

| | | | |
|---|---|---|---|
| 7,826,824 B2* | 11/2010 | Fischer et al. | 455/410 |
| 2002/0052200 A1* | 5/2002 | Arkko et al. | 455/432 |
| 2002/0118674 A1* | 8/2002 | Faccin et al. | 370/352 |
| 2002/0147021 A1* | 10/2002 | June | 455/452 |
| 2002/0159444 A1* | 10/2002 | Vialen et al. | 370/352 |
| 2002/0178354 A1* | 11/2002 | Ogg et al. | 713/155 |
| 2003/0031322 A1* | 2/2003 | Beckmann et al. | 380/278 |
| 2003/0039234 A1* | 2/2003 | Sharma et al. | 370/338 |
| 2003/0044011 A1* | 3/2003 | Vialen et al. | 380/201 |
| 2003/0211846 A1* | 11/2003 | Nagpal et al. | 455/434 |
| 2004/0162065 A1* | 8/2004 | Chun et al. | 455/422.1 |
| 2004/0228491 A1* | 11/2004 | Wu | 380/272 |
| 2005/0033960 A1* | 2/2005 | Vialen et al. | 713/170 |
| 2005/0037759 A1* | 2/2005 | Sipila et al. | 455/438 |
| 2005/0129236 A1 | 6/2005 | Sharma | |
| 2005/0152398 A1* | 7/2005 | Shin | 370/469 |
| 2005/0164634 A1* | 7/2005 | Tanaka et al. | 455/41.2 |
| 2006/0036862 A1* | 2/2006 | Tuvell et al. | 713/171 |
| 2006/0129848 A1* | 6/2006 | Paksoy et al. | 713/193 |
| 2006/0159031 A1* | 7/2006 | Vialen et al. | 370/252 |
| 2006/0166653 A1* | 7/2006 | Xu et al. | 455/412.2 |
| 2006/0171536 A1* | 8/2006 | Lim | 380/247 |
| 2006/0209798 A1* | 9/2006 | Oikarinen et al. | 370/352 |
| 2007/0005986 A1* | 1/2007 | Bernard et al. | 713/185 |
| 2007/0033411 A1* | 2/2007 | Zhao et al. | 713/181 |
| 2007/0041360 A1* | 2/2007 | Gallagher et al. | 370/352 |
| 2007/0115812 A1* | 5/2007 | Hughes | 370/229 |
| 2007/0147315 A1* | 6/2007 | Khoury et al. | 370/338 |
| 2007/0165551 A1* | 7/2007 | Proctor et al. | 370/312 |
| 2007/0192602 A1* | 8/2007 | Blom et al. | 713/169 |
| 2008/0069105 A1* | 3/2008 | Costa et al. | 370/392 |
| 2008/0214177 A1* | 9/2008 | Sehedic et al. | 455/422.1 |
| 2010/0232356 A1* | 9/2010 | Maheshwari et al. | 370/328 |
| 2010/0281577 A1* | 11/2010 | Mulet Salort et al. | 800/290 |

OTHER PUBLICATIONS

Bhargava et al., "Integrating Heterogeneous Wireless Technologies: A Cellular Aided Mobile Ad Hoc Network (CDMA)", 2004.*

Boman et al,. "UMTS security", 2002.*

ETSI 3$^{rd}$ Generation Partnership Project, "ETSI TS 133 234 v6.4.0 (Mar. 2005)", 2005.*

Schneir, B., "Applied Cryptography," Chapter 18: One-Way Hash Functions, pp. 429-60, 2nd Edition, John Wiley & Sons, ISBN 04711128457, 1996.

* cited by examiner 1) 1st Private Key/Algorithm

ASYMMETRIC CRYPTOGRAPHY FOR WIRELESS SYSTEMS

CROSS-REFERENCE TO RELATED APPLICATIONS

This application is the National Stage filing under 35 U.S.C. 371 of International Application No. PCT/KR2007/001412, filed on Mar. 22, 2007, which claims the benefit of U.S. Provisional Application Ser. Nos. 60/785,148, filed on Mar. 22, 2006, and 60/795,859, filed on Apr. 27, 2006, the contents of which are all hereby incorporated by reference herein in their entirety.

DISCLOSURE OF INVENTION

Technical Solution

The present invention relates generally to wireless communication systems, and in particular to methods for message authentication and protection.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS).

The long term evolution (LTE) of UMTS is under discussion by the 3rd generation partnership project (3GPP) which standardized UMTS. The 3GPP LTE is a technology for enabling high-speed packet communications. Many schemes have been proposed for the LTE objective including those which aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement. Generally, one NodeB is deployed in one cell. A plurality of user equipment (UE) may be located in one cell.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and a core network (CN). The E-UTRAN may include one or more evolved NodeB (eNodeB) 20. The CN may include a node for registering user equipment (UE) 10, and one or more E-UTRAN access gateway (AG) 30 positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. AG 30 provides an end point of a session and mobility management function for UE 10. The eNodeB and AG may be connected via an Si interface.

The eNodeB is generally a fixed station that communicates with a UE, and may also be referred to as a base station (BS) or an access point. One eNodeB may be deployed per cell. An interface for transmitting user traffic or control traffic may be used between eNodeBs.

AG 30 is also referred to as a mobility management entity/user plane entity (MME/UPE). The AG may be divided into a portion for performing a user traffic process and a portion for performing a control traffic process. New communication may be performed between the AG for performing the user traffic process, and an AG for performing the control traffic process using a new interface.

An interface for distinguishing between the E-UTRAN and the CN may be used. A plurality of nodes may be connected between eNodeB 20 and AG 30 via the Si interface. The eNodeBs may be connected to each other via an X2 interface and neighboring eNodeBs may have a meshed network structure that has the X2 interface.

FIG. 2 is a block diagram depicting architecture of a typical E-UTRAN. In this figure, eNB 20 may perform functions of selection for Access gateway (AG) 30, routing toward the AG during a Radio Resource Control (RRC) activation, scheduling and transmitting of paging messages, scheduling and transmitting of Broadcast Channel (BCCH) information, dynamic allocation of resources to UEs in both uplink and downlink, configuration and provisioning of eNB measurements, radio bearer control, radio admission control (RAC), and connection mobility control in LTE_ACTIVE state.

In the E-UTRAN, AG 30 may perform functions of paging origination, LTE-IDLE state management, ciphering of the user plane, supporting a Packet Data Convergence Protocol (PDCP) function, System Architecture Evolution (SAE) bearer control, and ciphering and integrity protection of Non-Access Stratum (NAS) signaling.

FIGS. 3 and 4 are block diagrams depicting the user-plane protocol and the control-plane protocol stack for the E-UTRAN. In these figures, the protocol layers may be divided into a first layer (L1), a second layer (L2) and a third layer (L3) based upon the three lower layers of an open system interconnection (OSI) standard model that is well-known in the art of communication systems.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIGS. 3 and 4 is depicted in dashed lines because if the RLC functions are implemented in and performed by the MAC layer, the RLC layer itself is not required. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

In FIG. 3, the RLC and MAC layers (terminated in an eNB on the network side) may perform functions such as Scheduling, Automatic Repeat Request (ARQ), and Hybrid Automatic Repeat Request (HARQ). The PDCP layer (terminated in an AG on the network side) may perform for the user plane functions such as a header compression, an integrity protection, and ciphering.

In FIG. 4, the RLC and MAC layers (terminated in an eNB on the network side) perform the same functions as for the user plane. In this figure, the RRC layer (terminated in an eNB on the network side) may perform functions such as broadcasting, paging, RRC connection management, Radio Bearer (RB) control, mobility functions, and UE measurement reporting and controlling. The PDCP layer (terminated in an aGW on the network side) may perform functions for the control plane such as an integrity protection and ciphering. The NAS (terminated in an aGW on the network side) may perform functions such as a SAE bearer management, an authentication, an idle mode mobility handling, a paging origination in LTE_IDLE, and a security control for the signalling between aGW and UE, and for the user plane.

The NAS may be divided into three different states. First, a LTE_DETACHED state if there is no RRC entity in the NAS; second, a LTE_IDLE state if there is no RRC connection while storing minimal UE information; and third, a LTE_ACTIVE state if the RRC connection is established. Also, the RRC may be divided into two different states such as a RRC_IDLE and a RRC_CONNECTED. In RRC_IDLE state, the UE may receive broadcasts of system information and paging information while the UE specifies a Discontinuous Reception (DRX) configured by NAS, and the UE has been allocated an identification (ID) which uniquely identifies the UE in a tracking area.

Also, in RRC-IDLE state, no RRC context is stored in the eNB. In RRC_CONNECTED state, the UE has an E-UTRAN RRC connection and a context in the E-UTRAN, such that transmitting and/or receiving data to/from the network (eNB) becomes possible. Also, the UE can report channel quality information and feedback information to the eNB. In RRC_CONNECTED state, the E-UTRAN knows the cell which the UE belongs to, such that the network can transmit and/or receive data to/from UE, the network can control mobility (handover) of the UE, and the network can perform cell measurements for a neighboring cell.

In RRC_IDLE mode, the UE specifies the paging DRX (Discontinuous Reception) cycle. Namely, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area to another tracking area, the UE will send a tracking area update message to the network to update its location.

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for authenticating messages in a communication network includes forming a super message having a plurality of individual messages such that at least two of the individual messages are intended for separate receiving entities. The method further includes creating a message authentication code (MAC) using a private key, such that the MAC is configured to permit authentication of the super message using a public key.

In one feature, the method further includes transmitting the super message in conjunction with the MAC to a plurality of receiving entities.

In another feature, the method further includes transmitting the public key to a plurality of receiving entities using an integrity protected message.

In yet another feature, the method further includes transmitting the public key to a plurality of receiving entities using a ciphered message.

In still yet another feature, the method further includes creating the MAC using the private key and a counter.

In one aspect, the method further includes transmitting at least some of the counter to a plurality of receiving entities.

In another aspect, the method further includes associating the counter with a timing reference.

In yet another aspect, the method further includes associating the counter with a system frame number (SFN).

In accordance with an alternative embodiment, a method for providing message protection includes receiving a first data block from a transmitting entity such that the first data block includes a first message authentication code (MAC) and a second data block. The method further includes generating a second MAC based upon a counter, an integrity protection key, and the second data block, comparing the second MAC with the first MAC, and requesting retransmission of the second data block if the second MAC does not correspond to the first MAC.

In one feature, the method further includes transmitting a sequence number to a receiving entity, such that the sequence number corresponds to the first data block and to at least a part of the counter.

In another feature, the generating operation includes a sequence number in the second data block, such that the sequence number corresponds to the first data block and to at least a part of the counter.

In yet another feature, the transmitting entity comprises either a nodeB or user equipment (UE).

In accordance with yet another embodiment, a method for providing message protection includes generating a message authentication code (MAC) based upon a counter, an integrity protection key, and a first data block, The method further includes generating a second data block which is integrity protected, such that the second data block includes the MAC and the first data block, and the MAC is configured to permit a request for retransmission of the second data block upon detection of unsuccessful reception of the second data block at a receiving entity. Another operation includes transmitting the second data block to the receiving entity without using cyclic redundancy code (CRC) with the second data block.

In still yet another embodiment, a method for authenticating messages in a communication network includes receiving a public key in a secure message from a first transmitting entity, and synchronizing a first counter at a receiving entity with a second counter at the first transmitting entity. In another operation, the method further includes authenticating a message received from a second transmitting entity based upon the message, the first counter, the public key, and an authentication algorithm.

In a further embodiment, a method for authenticating messages in a communication network includes receiving at least one broadcast message, receiving a public key in a secure message, receiving a message authentication code (MAC), defining a counter as a time difference between reception of the MAC and a timing reference, and authenticating the MAC using a counter, the broadcast message, an authentication algorithm, and the public key.

These and other embodiments will also become readily apparent to those skilled in the art from the following detailed description of the embodiments having reference to the attached figures, the invention not being limited to any particular embodiment disclosed.

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments. In the drawings.

Reference will now be made in detail to the preferred embodiments of the present invention, examples of which are illustrated in the accompanying drawings. Wherever possible, the same reference numbers will be used throughout the drawings to refer to the same or similar parts.

Figure 5:
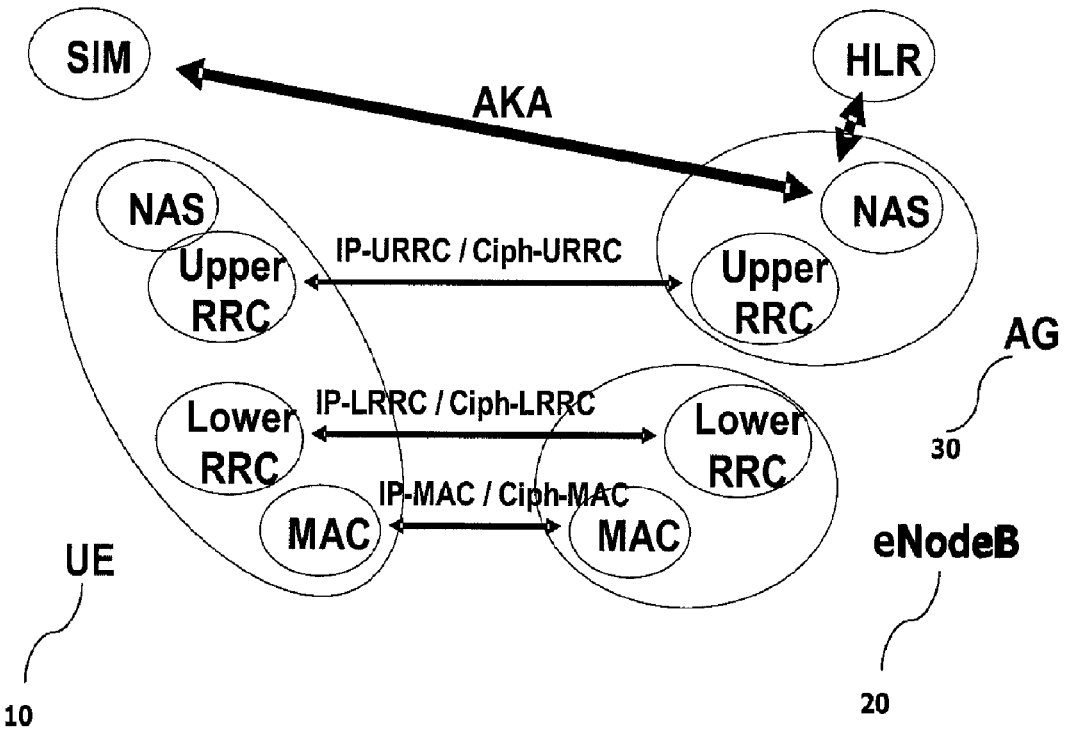
FIG. 5 depicts various entities of the control plane that may be related to security.

FIG. 5 depicts various entities (e.g., UE 10, eNodeB 20, and AG 30), of the control plane that may be related to security. For instance, non-access stratum (NAS) signaling, with regard to both ciphering and integrity protection, is typically implemented and terminated above eNodeB 20. The termination point is typically in AG 30 or above, and activation/deactivation is usually not controlled by the eNodeB. In the illustrated example, the NAS and upper RRC are handled as the same layer and are referred to as the URRC.

For the user plane, ciphering may be accomplished in the access gateway, or more specifically, in the user plane entity (UPE). Ciphering in the UPE potentially adds another security concern. It is not an essential feature to provide ciphering for RRC signaling that is terminated in the eNodeB (lower RRC), or to provide ciphering and integrity protection for MAC signaling terminated in the eNodeB.

It is often desirable to protect the NAS and URRC messages, for example, which are generated in UE 10 and AG 30. Ciphering and integrity protection of these messages may be accomplished using known techniques.

Figure 1:
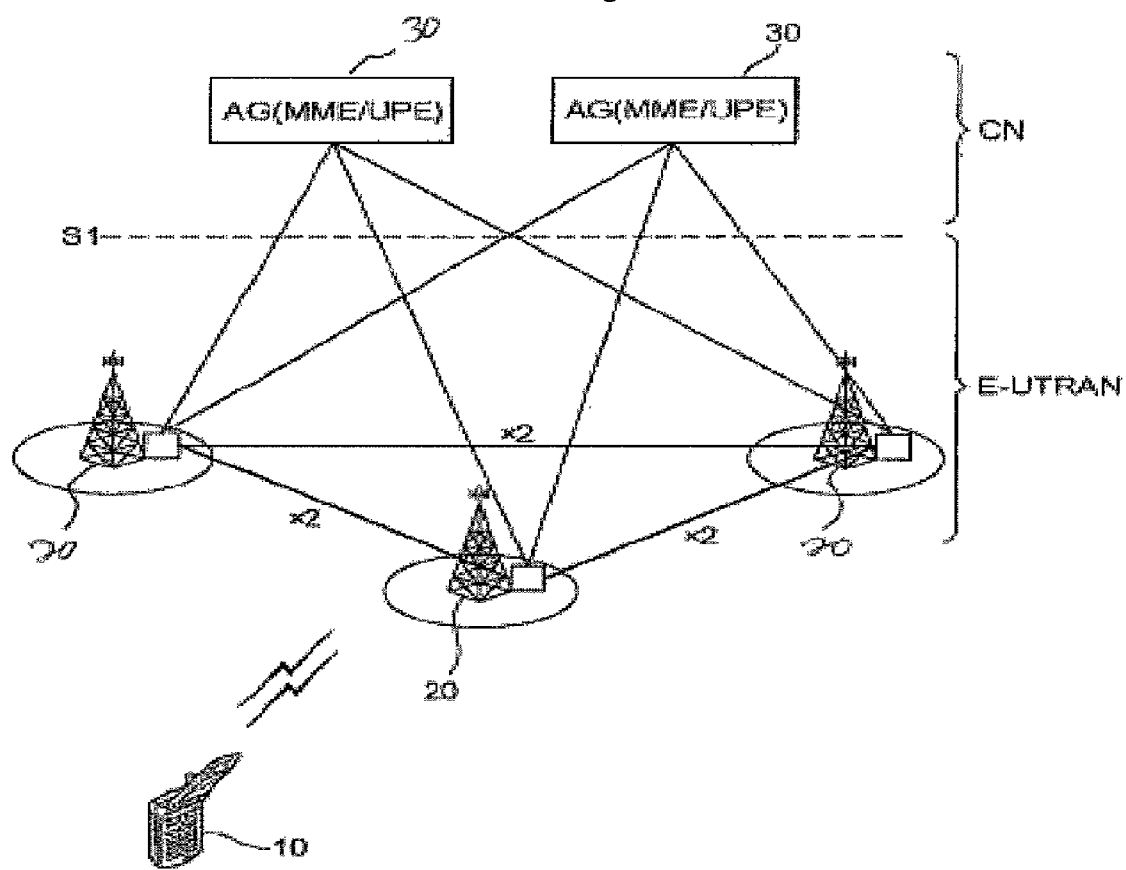
FIG. 1 is a block diagram illustrating a communication network, such as an evolved universal mobile telecommunication system (E-UMTS)
Figure 2:
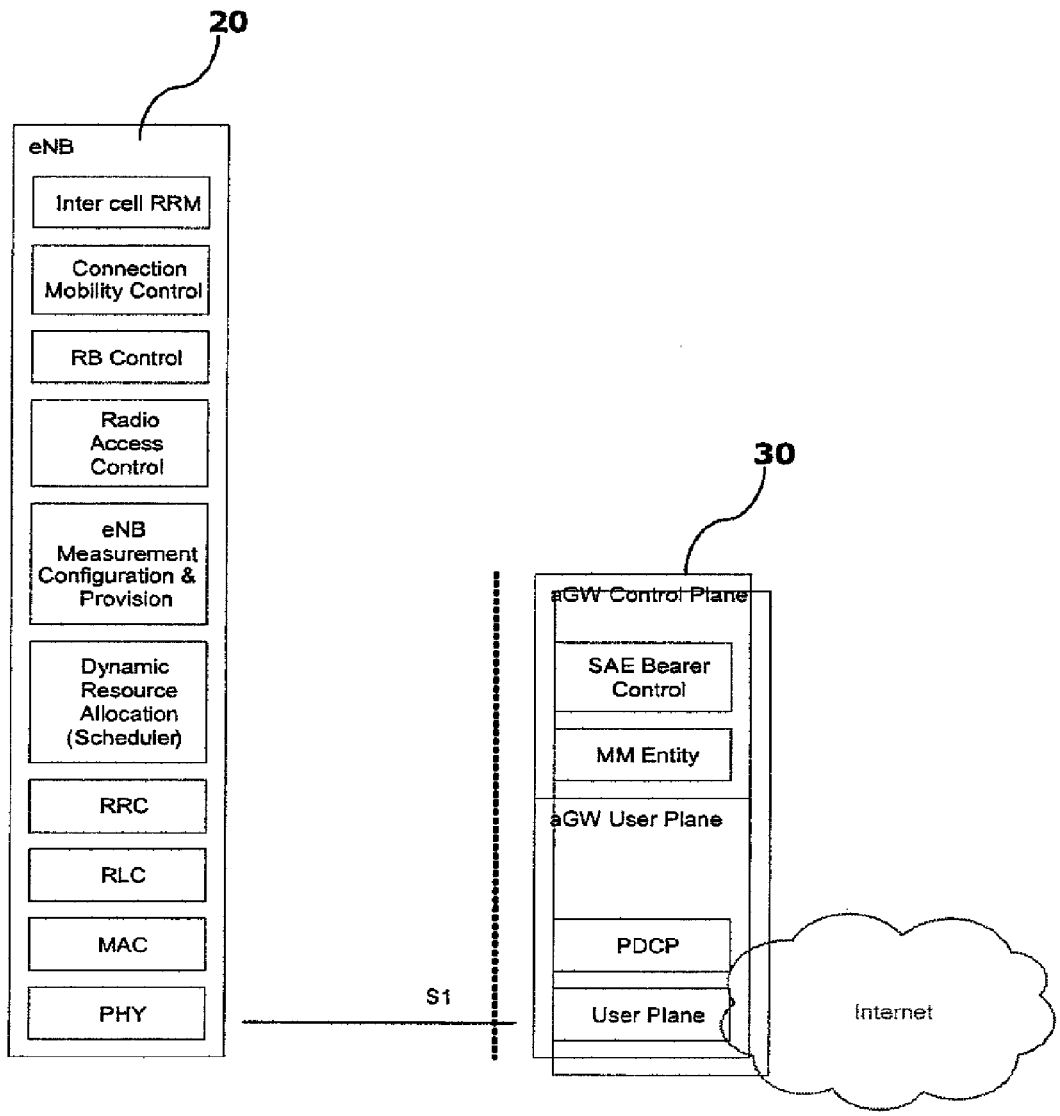
FIG. 2 is a block diagram depicting architecture of a typical E-UTRAN.
Figure 3:
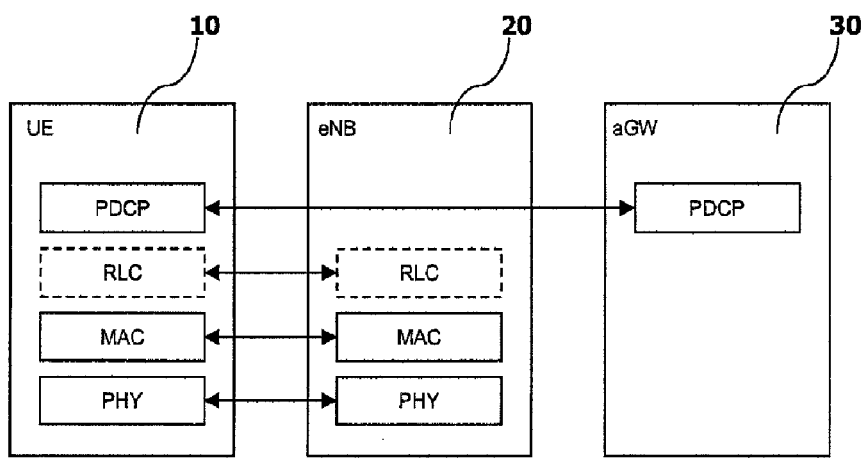
FIG. 3 is a block diagram depicting the user-plane protocol stack for the E-UTRAN.
Figure 4:
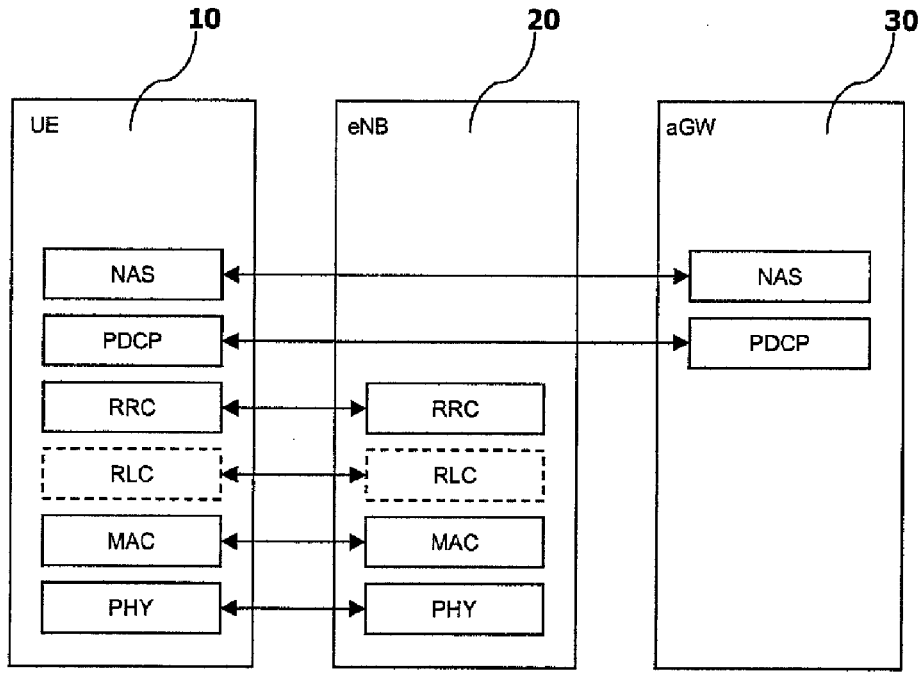
FIG. 4 is a block diagram depicting the control-plane protocol stack for the E-UTRAN.

In a conventional network, automatic repeat request (ARQ) sequence numbers (SNs) are typically included in the eNodeB, and ciphering is often performed in the AG. However, in accordance an embodiment, a sequence number may be introduced in the AG and/or UE. This sequence number may represent the last bits of a COUNT-C/I value, for example, which may be used as an input parameter to an algorithm that builds the message authentication code (MAC) (which is of course different than the MAC layer discussed with regard to FIG. 1), and as input to the ciphering algorithm.

Separate COUNT-C and COUNT-I values are not required. Consequently, at key change, algorithm change, or ciphering/integrity start or stop, a single activation time may be used instead of using separate activation times for ciphering and integrity. That is, the AG and the UE may indicate the sequence number for which the transmitting entity will use to initiate the new key or algorithm, and when the receiving entity needs to switch to the new key or algorithm.

Figure 6:
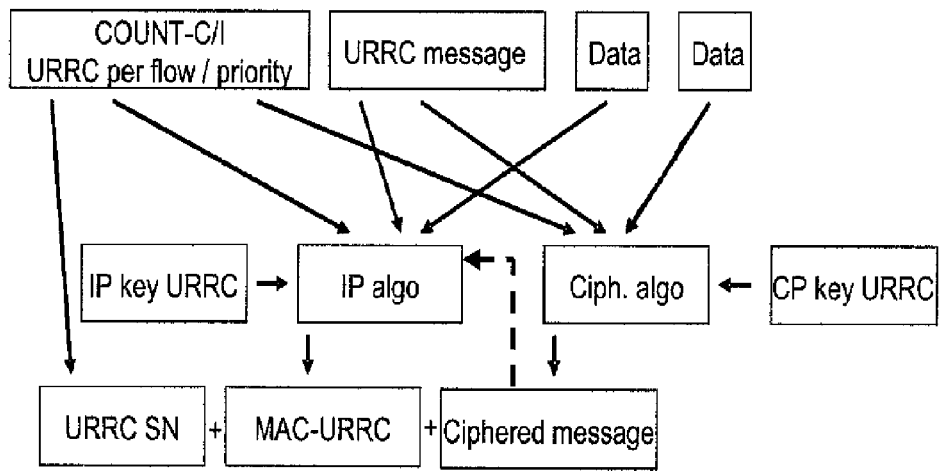
FIG. 6 is a block diagram depicting a method for transmitting security protected data, such as a MAC and ciphered message, over a transmission medium.

FIG. 6 is a block diagram depicting a method for transmitting security protected data, such as a MAC and ciphered message, over a transmission medium. In particular, FIG. 6 shows the ciphering algorithm receiving various parameters including COUNT-C and/or COUNT-I values, the input message, the ciphering key, and optionally other input data. Examples of the optional input data include the radio bearer/flow identification, and the direction of the communication (i.e., uplink or downlink), among others. The input message may be a URRC message, and may further include other NAS messages.

The integrity protection (IP) algorithm is also shown receiving assorted parameters including COUNT-C and/or COUNT-I values, the input message, the IP key, and optionally other input data. In a typical embodiment, the integrity protection and ciphering of the input message are performed in parallel, but this is not a requirement.

The ciphering algorithm may be configured to generate a ciphered message based upon the counter value (or values), input message, and ciphering key. Likewise, the IP algorithm may be configured to generate an unciphered message authentication code (MAC) based upon the counter value (or values), an integrity protection key, and either the input message or a ciphered input message. Next, security protected data comprising the MAC and the ciphered message may be transmitted over a transmission medium.

The IP key and the ciphering key are shown as separate keys, but this is not a requirement and a single key may be used for both integrity protection and ciphering, if so desired. Another alternative is to additionally perform ciphering of the MAC.

Various aspects of the embodiment of FIG. 6 relate to the protection of URRC messages. However, protection of user plane messages and lower RRC (LRRC) messages may be accomplished in a manner similar to that shown in FIG. 6.

Moreover, with regard to the lower RRC layer, since both ARQ and the LRRC are handled in the eNodeB, the UE and the eNodeB may perform ciphering in the ARQ layer instead of in the lower RRC layer.

Figure 7:
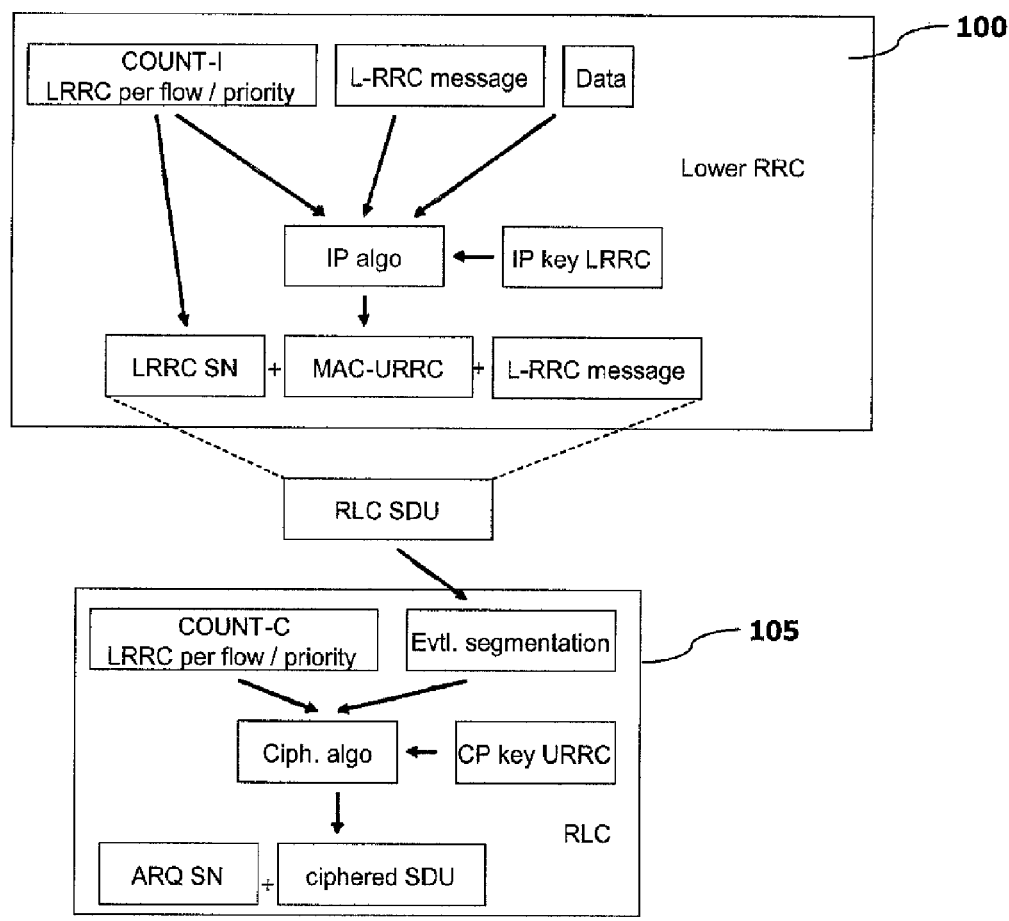
FIG. 7 is a block diagram which depicts a method for independently providing integrity protection and ciphering.

FIG. 7 is a block diagram which depicts a method for independently providing integrity protection and ciphering. In particular, the figure shows integrity protection being provided at lower RRC 100, and ciphering occurring at radio link control (RLC) layer 105.

Referring first to integrity protection, the IP algorithm is shown receiving assorted parameters including COUNT-I values, the input message, the IP key, and optionally other input data. The IP algorithm may be configured to generate an unciphered MAC based upon the counter value (e.g., sequence number), integrity protection key, and the input message. Next, integrity protected data, such as, for example, a service data unit (SDU). The SDU may include the MAC, the input (un-ciphered) message, and counter.

At RLC 105, the SDU, COUNT-C value, and the ciphering key is input to the ciphering algorithm. The ciphering algorithm may be configured to generate a ciphered message (e.g., ciphered SDU) based upon this input. These operations result in the generation of security protected data which includes the ciphered SDU.

Note that since integrity protection and ciphering occur independently, this process typically requires more sequence numbers than what is required in the embodiments of FIG. 6.

Figure 8:
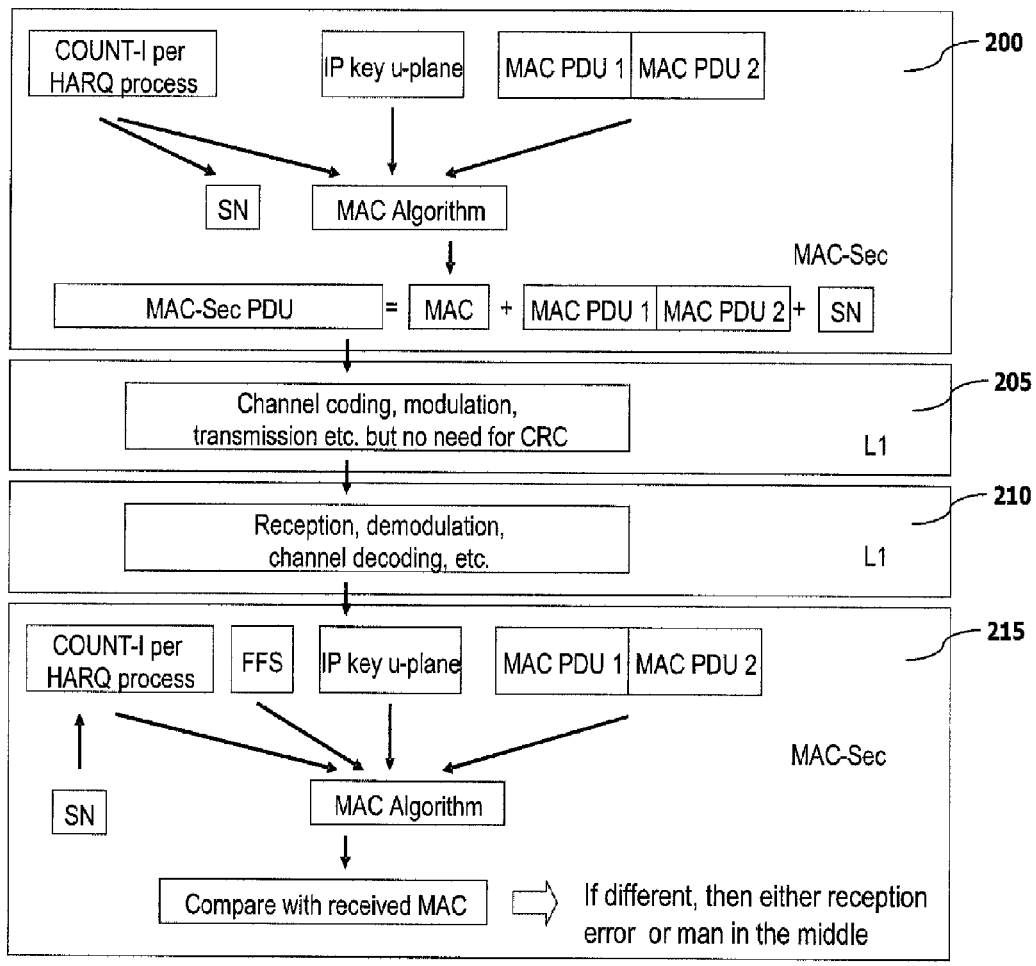
FIG. 8 is a block diagram depicting a method for performing integrity protection for U-plane data.

FIG. 8 is a block diagram depicting a method for performing integrity protection for U-plane data. It is known that integrity protection for U-plane data may result in significant overhead. Overhead problems often occur when small data blocks, such as those used for VoIP, are utilized. These scenarios are characterized by PDCP PDUs which are typically very small.

To reduce or otherwise minimize overhead caused by integrity protection, protection operations for U-plane data may be moved to the eNodeB/UE physical layer, and the cyclic redundancy check (CRC) may be replaced with a MAC. This arrangement prevents or minimizes potential threats on the air interface. An advantage of the technique of FIG. 8 is that during transmission on the physical air interface, there is no need to add another CRC code in order to check whether the data packet has been received correctly (e.g., without transmission errors).

The operations of FIG. 8 involve a transmitting entity and a receiving entity. In an embodiment, the transmitting entity is an eNodeB and the receiving entity is the UE. In this example, the operations of blocks 200 and 205 may be performed by the eNodeB, and the operations of blocks 210 and 215 may be performed by the UE. In an alternative embodiment, the transmitting entity is a UE, and the receiving entity is the eNodeB. In this example the operations of the UE and eNodeB are reversed such that the UE performs the operations of blocks 200 and 205, and the eNodeB performs the operations of blocks 210 and 215. By way of example only, further description of FIG. 8 refers to the example of transmission from the eNodeB to the UE.

At block 200, the MAC algorithm is shown receiving various parameters, such as COUNT-I, an integrity protection key, and an input message which may include U-plane data blocks (e.g., MAC PDU 1 and MAC PDU 2). The MAC algorithm may be configured to generate an integrity protected message, illustrated in the figure as MAC. These operations result in the forming of security protected data which includes the MAC (integrity protected), the input message, and optionally a sequence number. Recall that the counter value in both the transmitting and receiving side may be maintained by a sequence number (SN).

At block 205, the security protected data is processed for transmitting to the receiving entity (e.g., the UE). Typical processing which may occur includes channel coding, modulation, transmission, and the like. The security protected data is then transmitted by the eNodeB, which is subsequently received by the UE at block 210. The UE may process the received integrity protected data using conventional techniques (e.g., demodulating, channel decoding, and the like).

At block 215, and in a manner similar to that described in block 200, the MAC algorithm may be configured to generate the MAC. This second MAC value is then compared with the received first MAC (i.e., the MAC generated in block 200). If these MAC values differ, this would indicate that there is a reception error or that the data communicated between the eNodeB and the UE has otherwise been compromised in some manner (e.g., a man-in-the-middle attack). Moreover, if the first and second MAC values differ or otherwise do not correspond, a request for retransmission may be sent to the transmitting entity (e.g., the eNodeB). It is emphasized that that this request for retransmission does not require the use of the CRC.

Maintenance of the various counters (e.g. COUNT-C, COUNT-I) for URRC, U-plane, and LRRC, is desired in various situations. One technique for maintaining these counters is to add an explicit counter to every packet transmitted over the air. If a packet is later found to be missing the COUNT-C/COUNT-I values, synchronization is still possible as long as not more packets than half of the sequence number (SN) space are transmitted.

However, for the situation that the RLC (outer ARQ) is configured for lossless in-sequence transmission, it is not a requirement to add explicit sequence numbers that are used for the synchronization of COUNT-C/COUNT-I values between the transmitter and receiver. Instead it is typically sufficient to count the packets that are received, or that are indicated to be dropped (e.g., similar to that done in the move receiving window (MRW) procedure), thus reducing the overhead. The reduction in overhead is more prominent in situations in which only a few packets are dropped.

In UMTS, for example, the COUNT-C/COUNT-I values are initialized using either the START values or using a fixed value (e.g., 0) in the case that a new key is used. In LTE, it is often desirable to maintain the security context for as long as possible. Therefore a general example is one in which only new keys are used (at least for the control plane), which would reduce the need for transmitting START values for initializing the COUNT-C and COUNT-I values.

If key reuse is desired, it is sufficient to transmit the START values at the setup of the signaling connection. For a user plane bearer in UMTS, for example, the START value is often sent by the UE at radio bearer establishment. In this case, the START value would only require transmission when it is actually used.

In general, the type of context transfer that is expected may affect whether the COUNT-C/COUNT-I values (e.g. for the LRRC) are supposed to be maintained at the change of an eNodeB, or whether these values are to reinitialized upon the occurrence of this event. Both scenarios are possible and within the teachings of the present disclosure.

In GSM and UMTS, for example, the ciphering key (CK) and integrity key (IK) are typically generated by an authentication and key agreement (AKA) procedure. For instance, in UMTS, the AKA produces two different keys; one key for integrity protection, and a second key for ciphering. In an embodiment, such keys may be used for the ciphering and integrity protection of the URRC (RRC and NAS terminated in the AG).

Figure 9:
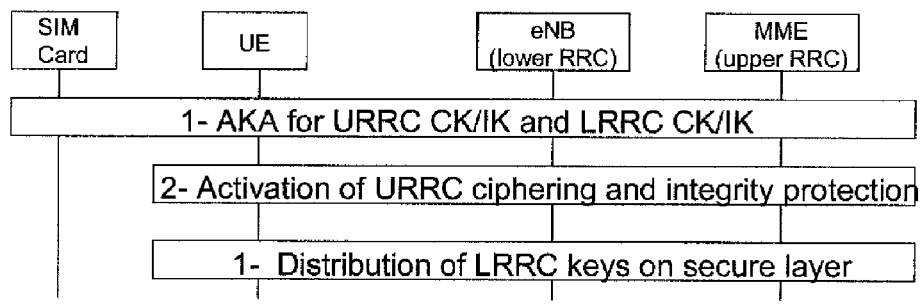
FIG. 9 depicts one approach for generating a desired second set of keys for the LRRC.

To achieve independent keys in the eNodeB for the LRRC and the AG for URRC/NAS, the need for a second set of keys may be required. FIG. 9 depicts one approach for generating a desired second set of keys for the LRRC. A first operation provides an AKA procedure for URRC CK and IK keys, and LRRC CK and IK keys. A second operation activates URRC ciphering and integrity protection. A third operation distributes the LRRC CK and IK keys on a secure layer. This example typically requires changes to the HLR, VLR, SIM card, which is not always a desirable action.

Figure 10:
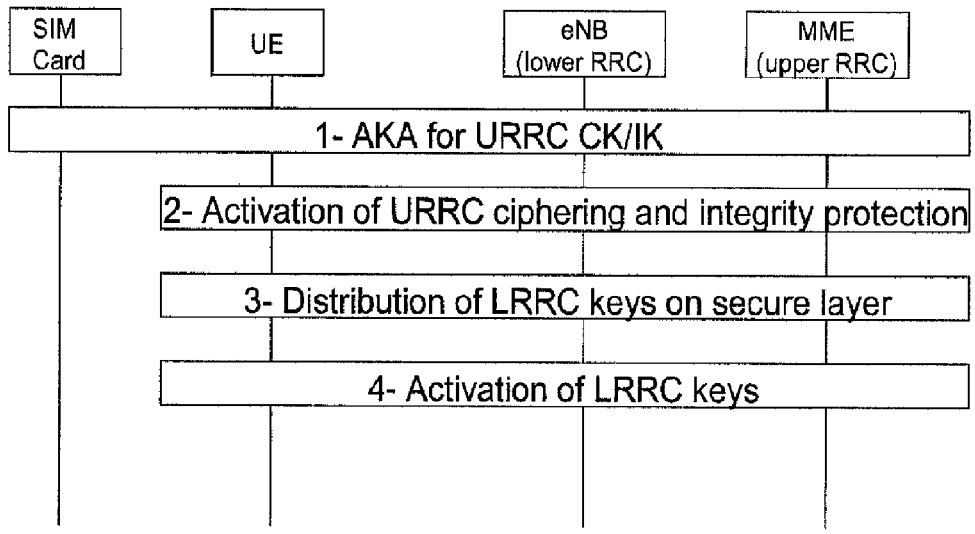
FIG. 10 depicts an approach for distributing the LRRC ciphering and/or integrity key.

Distributing the LRRC ciphering and/or integrity keys once the ciphered connection on the URRC/NAS is established is a technique which may be implemented to reduce the necessary impact that existing key generation techniques require during a typical AKA procedure. FIG. 10 depicts one such approach. In this figure, a first operation provides an AKA procedure for URRC CK and IK keys. A second operation activates URRC ciphering and integrity protection. A third operation distributes the LRRC CK and IK keys on a secure layer. A fourth operation activates the LRRC keys. The illustrated operations typically require ciphering which is systematically started in the AG. The illustrated procedure systematically requires two steps, which may slow down the session start procedure.

Figure 11:
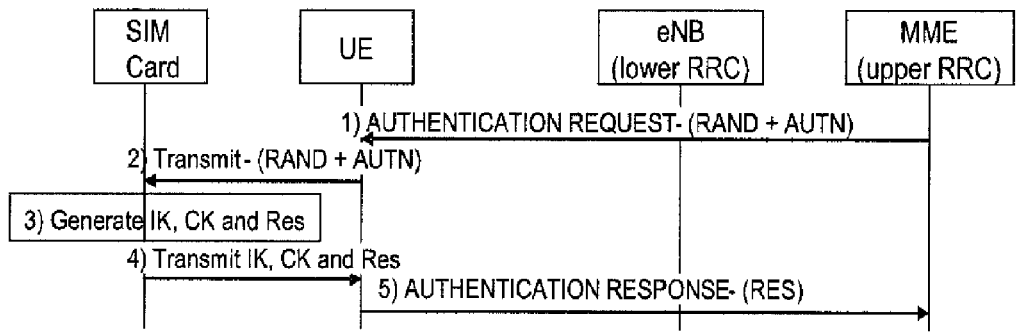
FIG. 11 depicts a typical AKA procedure using authentication parameters such as a random challenge (RAND) and an authentication token (AUTN)

FIG. 11 is an example of a typical AKA procedure using authentication parameters such as a random challenge (RAND) and an authentication token (AUTN). In particular, as a first operation, an authentication request having first authentication parameters RAND and AUTN is received by the UE.

In a second operation, the first authentication parameters are transferred to an authentication unit (e.g., SIM card). Algorithms associated with the SIM card may determine, for example, if the first authentication parameters verify that the AKA procedure has been initiated by an authorized entity.

In a third operation, the SIM card further generates a second set of parameters including an IK key, a CK key, and a second authentication parameter (e.g., response (RES) value). The second set of parameters is typically generated responsive to the first authentication parameters RAND and AUTN.

In a fourth operation, the second set of parameters is then transferred from the SIM card to the UE. In a fifth operation, the UE responsively generates an authentication response RES, which is sent to the AG so that the authenticity of the UE and/or SIM card may be verified, for example.

Figure 12:
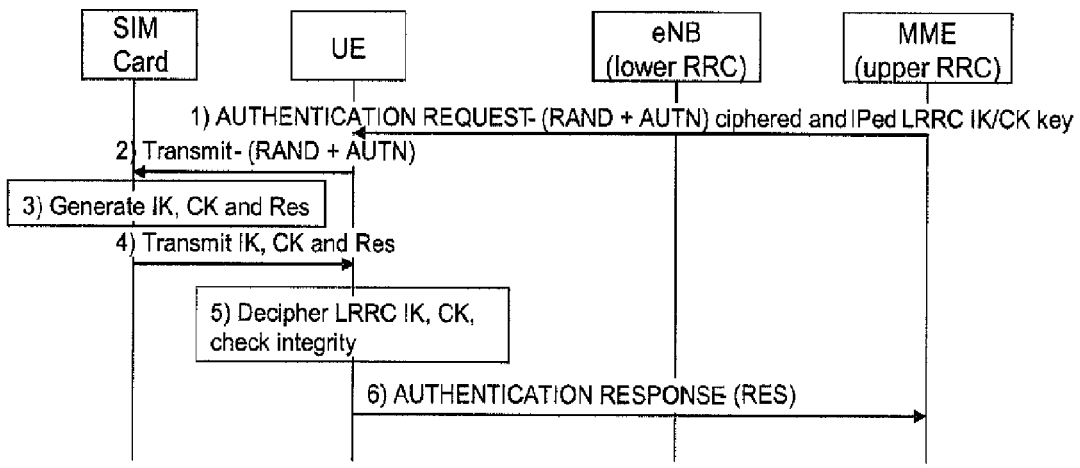
FIG. 12 depicts an AKA procedure using authentication parameters and at least one key value.

FIG. 12 is an example of an AKA procedure using authentication parameters and at least one key value. Although FIGS. 9 and 10 have several common aspects, the embodiment of FIG. 12 utilizes one or more key values at various stages of processing.

In a first operation, an authentication request having first authentication parameters RAND and AUTN is received by the UE. The authentication request may further include at least one key value (e.g., an LRRC IP/CK key) which is integrity protected and ciphered.

In a second operation, first authentication parameters RAND and AUTN are transferred to an authentication unit (e.g., SIM card). Algorithms associated with the SIM card may determine, for example, if the first authentication parameters verify that the AKA procedure has been initiated by an authorized entity.

In a third operation, the SIM card further generates a second set of parameters including an IK key, a CK key, and a second authentication parameter (e.g., response (RES) value). The second set of parameters is typically generated responsive to the first authentication parameters RAND and AUTN.

In a fourth operation, the second authentication parameter, IK key, and CK key, which were are all generated based upon the first authentication parameters RAND and AUTN, are then transferred from the SIM card to the UE.

A fifth operation includes deciphering the at least one key value (e.g., an LRRC IP/CK key) based upon the IP key and the CK key. If desired, the fifth operation may additionally or alternatively verify the integrity of the least one key value.

In a sixth operation, the UE may responsively generate an authentication response RES, which is sent to the AG so that the authenticity of the UE and/or SIM card may be verified, for example.

One benefit of this procedure is that the LRRC keys, for example, may have already been transferred during the AKA procedure. Thus, when new URRC keys are generated, the LRRC keys may be made available simultaneously which would decrease the amount of time necessary for the transition from detached to idle/active state in LTE. The LRRC key sets may be generated in the eNodeB and transferred to the AG. Alternatively, the LRRC key sets may be chosen by the HLR, transferred to the AG, and then sent to the UE/eNodeB.

Figure 13:
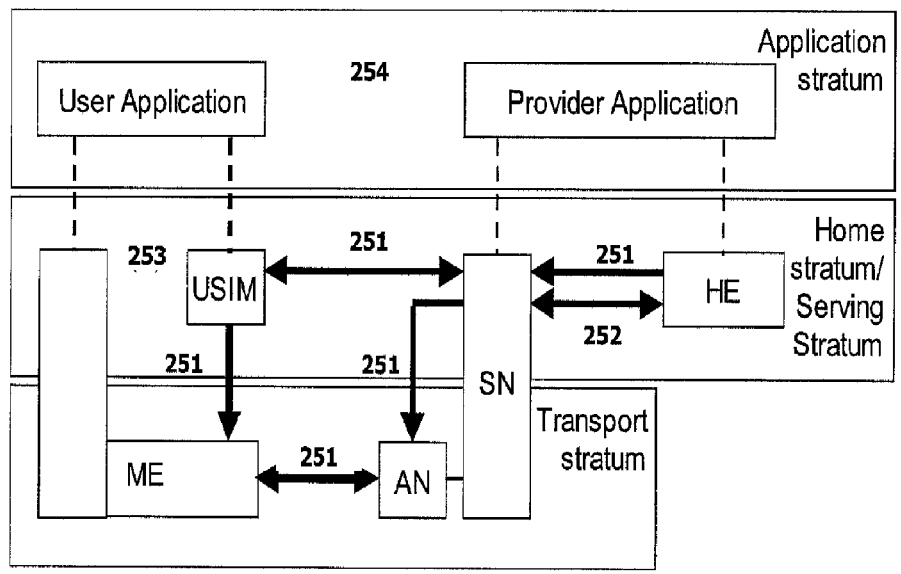
FIG. 13 is a block diagram providing an overview of various components of 3G security architecture.

FIG. 13 is a block diagram providing an overview of various components of 3G security architecture. In this figure, five exemplary security feature groups are identified. Each of these groups meet certain threats and accomplishes certain security objectives.

Network access security 251 includes the set of security features that provide users with secure access to 3G services, and which in particular protect against attacks on the (radio) access link. Network domain security 252 includes the set of security features that enable nodes in the provider domain to securely exchange signaling data, and protect against attacks on the wireline network. User domain security 253 includes the set of security features that secure access to mobile stations. Application domain security 254 includes the set of security features that enable applications in the user and provider domain to securely exchange messages. Visibility and configurability of security includes the set of features that enable the user to inform itself as to whether or not a security feature is in operation, and whether the use and provision of services should depend on the security feature.

Figure 14:
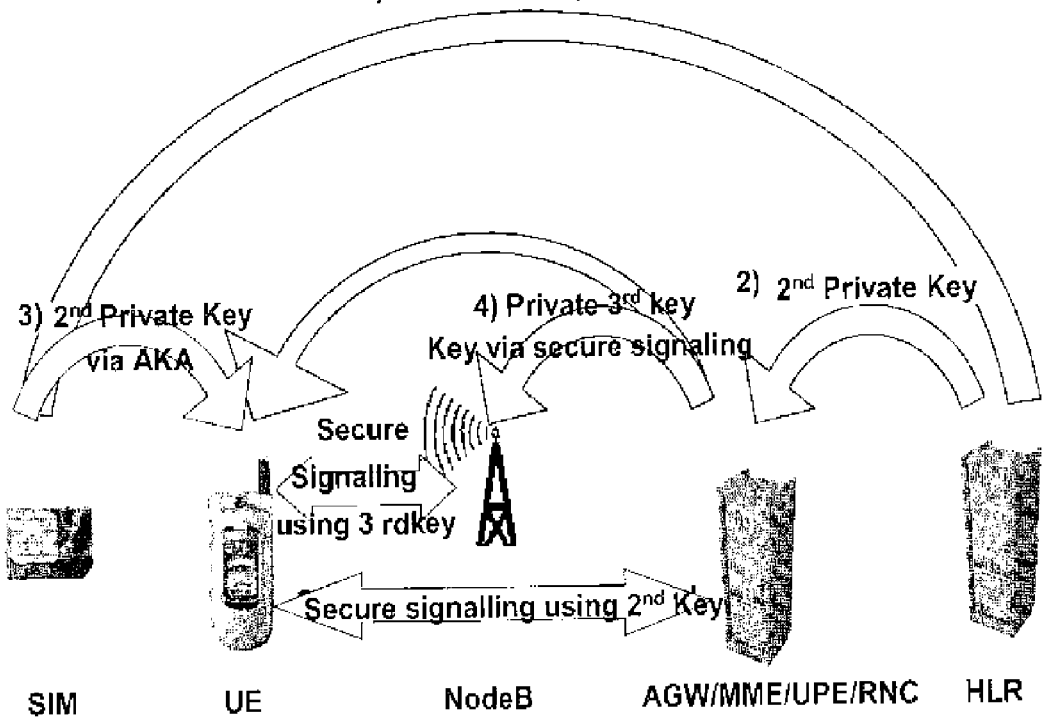
FIG. 14 depicts various techniques for key generation and distribution in the LTE.

FIG. 14 depicts various techniques for key generation and distribution in the LTE. For instance, second order key sets are shown generated in the SIM card and in the HLR based on an algorithm that is included in the SIM card and the HLR. During the authentication procedure, this second order key set may be transmitted to various entities on the network side (e.g., RNC, AG, MME, UPE, etc.), and to the UE as well. Once these keys are in place, and ciphering has started, it is possible to transmit from the network entity an independent key set to the NodeB, and to the UE via a secure signaling connection between the network entity and the UE.

Various security features related to user identity confidentiality are available. Such features include user identity confidentiality, user location confidentiality, and user untraceability. User identity confidentiality is the property that the permanent user identity (IMSI) of a user to whom services is delivered cannot be eavesdropped on the radio access link. User location confidentiality is the property that the presence or the arrival of a user in a certain area cannot be determined by eavesdropping on the radio access link. User untraceability is the property that an intruder cannot deduce whether different services are delivered to the same user by eavesdropping on the radio access link.

To achieve these objectives, for example, the user is normally identified by a temporary identity by which they are known by the visited serving network. To avoid user traceability, which may lead to the compromise of user identity confidentiality, the user is not identified for a relatively long period of time. To achieve these security features, signaling or user data that might reveal the user's identity may additionally be ciphered on the radio access link.

Various security features related to entity authentication are also provided. Examples of these features include user authentication, and network authentication. User authentication is the property that the serving network corroborates the user identity of the user. Network authentication is the property that the user corroborates that they are connected to a serving network that is authorized by the user's HE to provide services to the user. This feature also includes the guarantee that this authorization is recent.

To achieve these objectives, it is assumed that entity authentication occurs at each connection set-up between the user and the network. Two mechanisms have been included: an authentication mechanism using an authentication vector delivered by the user's HE to the serving network, and a local authentication mechanism using the integrity key established between the user and serving network during the previous execution of the authentication and key establishment procedure.

Conventional authentication and key establishment mechanisms may be implemented to achieve the security features listed above, and may also be used to establish a secret cipher key and integrity key between the user and the serving network. This mechanism is typically invoked by the serving network after a first registration of a user in a serving network, and after a service request, location update request, attach request, detach request, or connection re-establishment request, when the maximum number of local authentications using the derived integrity key have been conducted.

A local authentication mechanism achieves the security features of user authentication and network authentication, and uses an integrity key established between the user and serving network during the previous execution of the authentication and key establishment procedure. This mechanism may be invoked by the serving network after a service request, location update request, attach request, detach request, or connection re-establishment request, provided that the maximum number of local authentications using the same derived integrity key has not been reached yet.

Various security features may also be implemented with regard to the confidentiality of data on the network access link. Examples of these security features include cipher algorithm agreement, cipher key agreement, confidentiality of user data, and confidentiality of signaling data. Cipher algorithm agreement includes the property that the UE and the SN can securely negotiate the algorithm that they shall use subsequently. A cipher key agreement may include the property that the UE and the SN agree on a cipher key that they may use subsequently. Confidentiality of user data typically has the property that user data cannot be overheard on the radio access interface. Confidentiality of signaling data may have the property that signaling data cannot be overheard on the radio access interface.

Cipher key agreement and integrity key agreement may be realized in the course of the execution of the mechanism for authentication and key agreement. These algorithm agreements are often realized using a mechanism for security mode negotiation between the user and network. This mechanism also enables the selected ciphering/integrity algorithm and the agreed cipher/integrity key to be applied.

Data integrity may include security features concerning the integrity of data on the network access link. Such features may include an integrity algorithm agreement, an integrity key agreement, and data integrity and origin authentication of signaling data. Integrity algorithm agreement includes the property that the UE and the SN can securely negotiate the integrity algorithm that they shall use subsequently. The integrity key agreement includes the property that the UE and the SN agree on an integrity key that they may use subsequently. The data integrity and origin authentication of signaling data may include the property that the receiving entity (UE or SN) is able to verify that signaling data has not been modified in an unauthorized way since it was sent by the sending entity (SN or UE) and that the data origin of the signaling data received is indeed the one claimed.

Public key cryptography is a form of cryptography which generally allows users to communicate securely without having prior access to a shared secret key. This is typically done by using a pair of cryptographic keys, designated as public key and private key, which are mathematically related. Various types of public key cryptography are available including public key encryption, public key digital signature, and key agreement. Public key encryption includes keeping a message secret from anyone that does not possess a specific private key. Public key digital signature allows one to verify that a message was created with a specific private key. Key agreement generally allows two parties that may not initially share a secret key to agree on one.

One type of private key encryption includes a private (deciphering) key and a public (ciphering) key generated by a receiver. The receiver keeps the private (deciphering) key secret, and transmits in a first operation the public (ciphering) key to the transmitter. It is useful to understand that the public (ciphering) key can be sent to the transmitter in a way that other persons can also receive this key. That is, there is no requirement to keep the public (ciphering) key secret.

Other information related to the key such as fixed parameters can also be transmitted to the transmitter, or they can alternatively be fixed beforehand between the transmitter and the receiver. There is no specific requirement to keep this information secret.

When the transmitter transmits a message to the receiver, the message may include the public (ciphering) key and other parameters which are provided to an encryption algorithm that creates a ciphered message. The receiver is able to decipher the message using the private (deciphering) key and the other fixed parameters using the deciphering algorithm. One point with this scheme is that only the receiver that has the private (deciphering) key is able to decipher the message. This technique establishes a relatively secret communication between the transmitter and the receiver.

Another application of public key cryptography is the authentication of a message. To make sure that a message has been sent by the transmitter, the transmitter may sends a public key via a secure connection to the receiver. The two step approach is often used, in which a first keyless algorithm is used in order to generate a signature of the message, typically called a HASH function, and a second algorithm using private and public keys is used that encrypts/decrypts the signature. One feature of the HASH function is that it is very difficult to build a message for which the HASH function will create a given signature.

When the sender wants to transmit a message to the receiver it may calculate a signature (e.g., MAC) based on the message, signed with a HASH function, the private key, and other information that might have been sent to the receiver beforehand or that might be fixed in the algorithm. The transmitter then sends the signed message together with the MAC to the receiver.

Using the public key received by the transmitter, the receiver can then check whether or not the signature has been created with the private key that is related to the public key. The private/public key encryption algorithm is then applied on the signature that is output by the HASH function.

As previously described, in the UMTS/LTE system, for example, signaling information is transmitted to the UE, and such information may be used to control various functions and behavior of the UE. Similarly, the UE reports to the network various types of information including, for example, the availability of resources and control information. In a typical UMTS system, the RRC signaling for certain functions are integrity protected to prevent or inhibit interference by a hacker. An example of such interference is the transmitting of a false message causing premature call termination. However, in conventional systems, MAC and physical layer signaling is typically not protected and is therefore susceptible to illicit interference.

Introducing integrity protection to the MAC and physical layers using a secret key algorithm would typically require use of a secret key to generate a MAC code, and then appending the MAC code (and possibly a SN) for each physical layer or MAC message. However MAC and physical layer signaling is generally very small. Adding such MAC codes to these layers would therefore result in an increase in overhead for the MAC and physical layer signaling.

Figure 15:
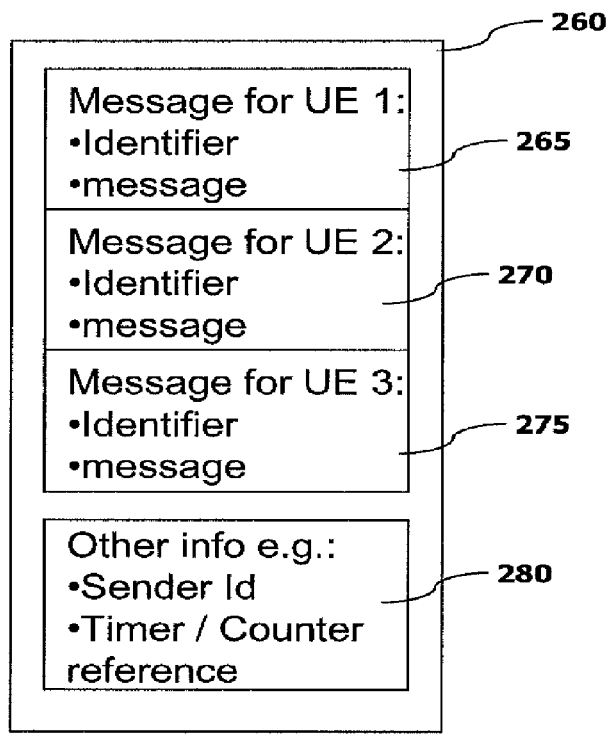
FIG. 15 depicts a super message having three individual messages intended for separate receiving entities.

FIG. 15 depicts super message 260, which includes three individual messages 265, 270, 275. Each of the individual messages are intended for separate UEs and include an identifier which identifies the UE to which the message is directed and the actual message. The super message may also include other information 280 (e.g., MAC, sender identification, timer, counter, and the like). The MAC may be created using, for example, a private key. The MAC is arranged to permit authentication of the super message using a public key. If desired, the super message may be configured as a broadcast message (e.g., MBMS control or user plane message) sent to several UEs, a MAC layer message, a physical layer message, and the like.

Figure 16:
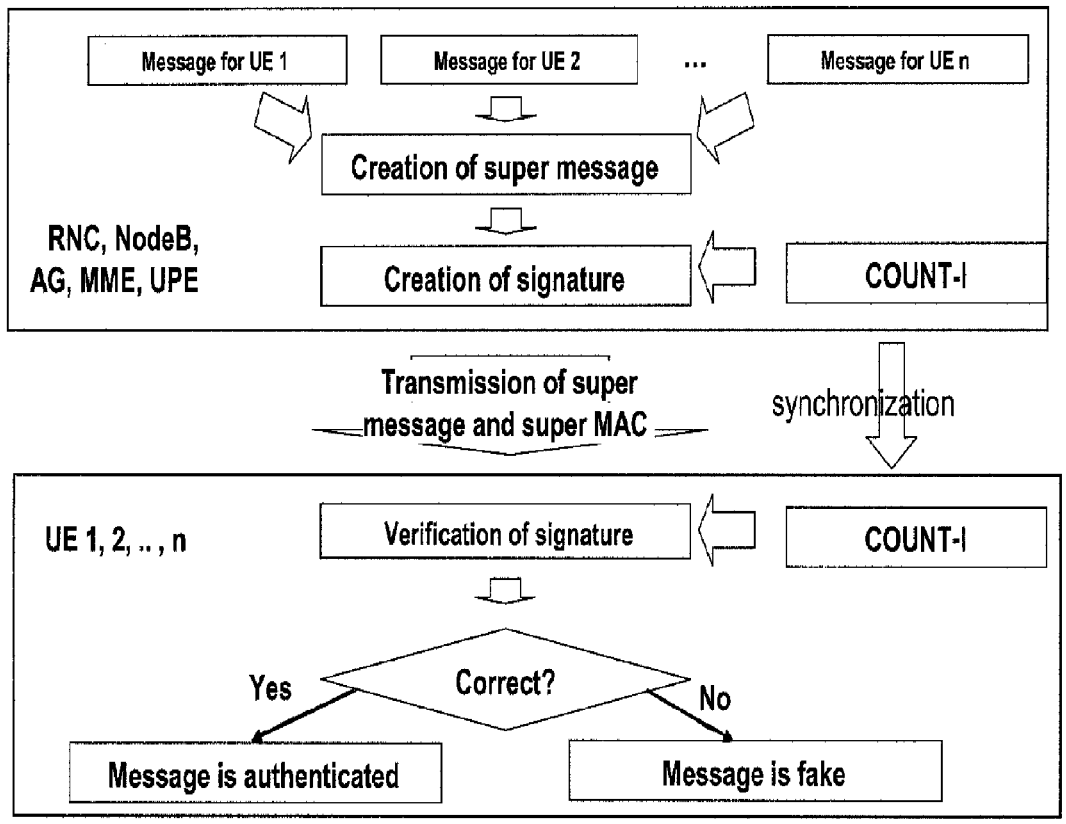
FIG. 16 is a flowchart depicting a method for authenticating messages in a communication network in accordance with an embodiment of the present invention.

FIG. 16 is a flowchart depicting a method for authenticating messages in a communication network in accordance with an embodiment of the present invention. In particular, this figure depicts the creation of a super message, such as that depicted in FIG. 15, and which is structured to protect small signaling messages intended for different UEs.

In an embodiment, the super message is a message directed to a set of UEs. An example of such a super message is one in which information is sent from a transmitting entity that a UE may or may not have established a connection with, and that indicates to the UE that it should increase or decrease resources used in the uplink transmission.

Communicating the same secret key to a plurality to UEs raises a security concern. Since all of the UEs receive the same secret key, it is possible that one of the UEs will take advantage of this and create and send false messages to other UEs. It is therefore possible that the other UEs will not be able to readily distinguish these false messages from legitimate messages.

One technique for minimizing or eliminating this problem is to implement a public key algorithm, such as that described above. An advantage of a public key algorithm is that the public key can be used for checking integrity, but does not require that this key be kept secret. However, if a public key is used, it is desirable that it is received from a trusted entity via a trusted method.

For instance, the public key may be sent from the network to the UE via a secure dedicated connection using messages that are integrity protected and/or ciphered (e.g., using a second order or third order key as described above). In this embodiment, the public key would typically only be generated if the UE is in a connected mode. To accomplish this aspect, the UE may first create a secure connection via an appropriate mechanism (e.g., an AKA procedure) to create a secure connection with the network. This feature identifies the network and creates a trust relationship before the UE uses the created key.

One threat in a public key system is referred to as replay. Replay occurs when an unauthorized third entity tries to establish a connection to a UE by pretending that the network associated with the third entity is a trusted network of the UE. In this case, the unauthorized third person receives messages from the real operator network and replays these messages, thus creating a communication with the UE.

One technique to prevent replay is to utilize a mechanism which enables the UE, for example, to determine if the message is a new or replayed message. One such mechanism is to implement a counter value (e.g., COUNT-I) associated with the message. For instance, the counter value may be added to a creation/checking operation. A given message may be considered valid by the UE when the message is received during the time period specified by the counter value. That is, the message may be deemed valid only if the message is received by the UE at a time in which the counter value is valid.

In an embodiment, the integrity sequence number COUNT-I is 32 bits long. For signaling radio bearers (RB 0-4) there is one COUNT-I value per uplink signaling radio bearer, and one COUNT-I value per downlink signaling radio bearer. COUNT-I generally includes two parts: a "short" sequence number and a "long" sequence number. The short sequence number forms the least significant bits of COUNT-I, while the long sequence number forms the most significant bits of COUNT-I. The short sequence number is the 4-bit RRC sequence number (RRC SN) that is available in each RRC PDU. The long sequence number is the 28-bit RRC hyper frame number (RRC HFN) which is incremented at each RRC SN cycle.

The counter value may be added to the message or otherwise utilized for the calculation of the signature. A unique signature therefore includes a message, a key, and a counter value. This unique signature may only be considered valid if the UE deems the received counter as being valid or otherwise acceptable. If the counter does not correspond to the expected value, this may indicate that the received message is a replayed message.

Protection of MAC and Physical Layer Signaling

It is generally desirable to increment the counter in a predetermined manner such that the UE can ascertain that the counter value does (or does not) indicate that an associated message has been replayed. A technique for accomplishing this is to increment the counter at each transmission of the message Once the counter is synchronized (e.g., when the UE sends it to the network or the network sends it to the UE via a trusted relation), it is possible that only the least significant bits (LSB) of the message counter are transmitted to the receiver along with the message and signature.

The receiver generally maintains the same counter and increments this counter at each received message. The LSB of the counter value (e.g., COUNT-I) protect against messages that are lost over the air. If the LSB of the counter value received with the message do not match with the LSB stored locally at the receiver then it is assumed that one or more messages have been lost. Messages that have been sent over the air once cannot be replayed to the receiver since the counter maintained by the receiver would not match the counter value used for the creation of the message.

Counter Values Linked to a Time Reference

In accordance with an embodiment of the present invention, a time reference may be used to prevent replay instead of the previously described counter. In this embodiment, COUNT-I may represent a difference in time between the transmission/reception of the message and a common time reference maintained in the transmitter and receiver. This typically requires that that UE and network synchronize their respective time references to ensure that both the UE and network use the same COUNT-I value for the coding and decoding of the messages.

When the signature is created, the time instant of this creation would be accounted for. Similarly, the receiving entity (e.g., the UE) would note the reception time instant at which the UE receives the message from the network. The reception time may be used by the UE for calculating the counter value.

Key Reuse Protection in Neighboring Cells

Note that situations in which the same key is used for a set of neighboring cells, a potential threat is one in which messages from one cell could be replayed to another cell. Additional procedures may be used to minimize or eliminate the risk of this potential threat. For instance, an additional parameter (e.g., a cell-specific code or identification) may be added to the message such that this parameter is specific to each cell, thus preventing replay in neighboring cells.

In an embodiment, a received message would be considered valid if the counter for the specific transmitting entity (e.g., cell) is valid, the signature is correctly verified taking into account the message, the counter (COUNT-I), and the cell-specific code.

To ensure that the cell-specific code actually belongs to the desired operator cell, it is useful to transmit the cell-specific code in a manner that safeguards its authenticity so that the UE can be certain that the transmitting cell actually exists.

One technique for accomplishing this is to transmit the cell-specific code as a broadcast or multicast transmission, for example, via protected signaling (e.g., public key algorithm). If the same public key is used for different cells, it should be indicated for which cell a given key is valid. Alternatively, the cell-specific code may be confirmed as valid if received via dedicated secure signaling.

It is possible that neighboring cells are not time synchronized and the counter value linked to a time offset of a time reference. In such a case, the time offset between the time reference of the current cell and the time reference of the neighboring cell is broadcast using, for example, secured signaling. Alternatively, the cell-specific code and the offset between the COUNT-I value of the current and neighboring cell may also be sent via dedicated secure signaling.

Counter Synchronization

An alternative approach for reusing the same key for neighboring cells includes synchronizing the set of cells such that counter values used in each cell are sufficiently time-aligned. In this embodiment, the counter is incremented at each transmission of the message.

If the counter provides the difference compared to a time reference, it is only necessary that the neighboring cells are synchronized. It is further useful to have an identification of the set of neighboring cells. Such identification may be sent on, for example, dedicated signaling or broadcast/multicast signaling which is therefore protected by a private symmetric key algorithm.

Protection of System Information and MBMS Signaling

It is generally understood that system information and MBMS signaling is information that is valid for a certain time in a cell or a set of cells. Furthermore, this information is broadcast, and thus, it is repeated regularly. In order to increase the probability for successful reception, the information is typically split into blocks that are repeated regularly, which permits the UE to combine any repetition of the different parts of the message in order to rebuild or otherwise provide for a complete message.

To prevent or inhibit replay in a typical broadcast situation, it is only necessary that a given signature cannot be reused on a different cell for a given message. Therefore, one possibility is to transmit a signature for a message in a separate block, and then regularly change this signature and corresponding counter value without changing the message parts.

In an embodiment, protecting against replay in neighboring cells includes the use of a cell-specific code or identity for each cell. The UE can therefore use a signature, and the counter value related to the signature, in order to verify a message that is created by combining blocks of the message that have been received before or after the signature.

To perform various methods disclosed herein it is typically necessary to use a secure algorithm for creating the signatures and HASH values. Examples of suitable algorithms include a digital secure algorithm (DSA) by the National Security Association, the Rivest, Shamir, and Adleman (RSA) algorithm, elliptic curve cryptography (ECC), and the like. Versions of such algorithms are currently implemented in IETF RFC 2459. Suitable hash functions include, for example, secure hash functions SHA-1, SHA-224, SHA-256, SHA-384, and SHA-512. Symmetric algorithms that may be implemented include the f9 algorithm currently used in UMTS.

Figure 17:
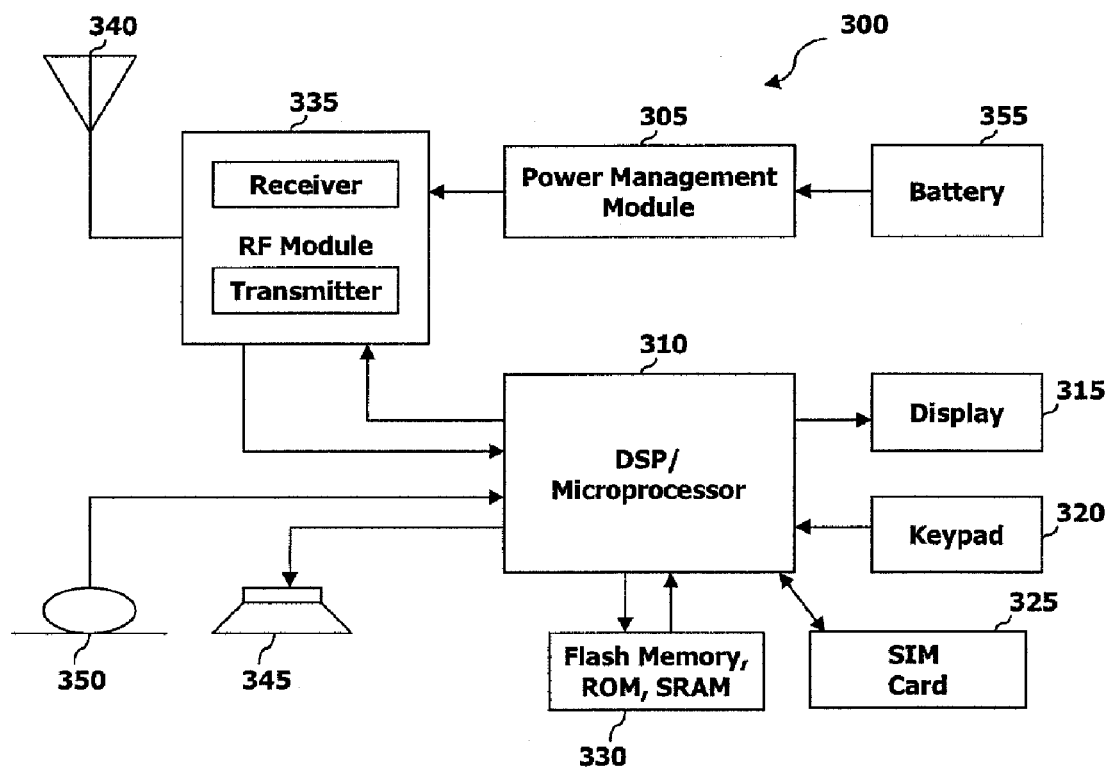
FIG. 17 is a block diagram of a mobile communication terminal.

FIG. 17 is a block diagram of mobile communication device 300, which may be configured as a UE in accordance with embodiments of the present invention. Device 300 is illustrated, for example, as a mobile phone and may be configured to perform various methods described herein. The mobile communication device 300 includes a processing unit 310 such as a microprocessor or digital signal processor, RF module 335, power management module 305, antenna 340, battery 355, display 315, keypad 320, optional subscriber identify module (SIM) card 325, memory unit 330 such as flash memory, ROM or SRAM, speaker 345 and microphone 350.

A user enters instructional information, such as a telephone number, for example, by pushing the buttons of keypad 320 or by voice activation using microphone 350. Processing unit 310 receives and processes the instructional information to perform the appropriate function, such as to dial the telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, for example, transmit radio signals comprising voice communication data. RF section 335 comprises a receiver and a transmitter to receive and transmit radio signals. Antenna 340 facilitates the transmission and reception of radio signals. Upon receiving radio signals, RF module 335 may forward and convert the signals to baseband frequency for processing by processing unit 310. The processed signals would be transformed into audible or readable information outputted via speaker 345, for example.

Processing unit 310 is adapted to perform various methods disclosed herein, among other operation. It will be apparent to one skilled in the art that mobile communication device 300 may be readily implemented using, for example, processing unit 310 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

The invention claimed is:

1. A method for authenticating messages in a communication network, the method comprising:
    forming a super message comprising a plurality of individual messages, wherein at least two of the individual messages are intended for separate receiving entities of a plurality of receiving entities;
    creating a message authentication code (MAC) using a private key and a counter value comprising 4 least significant bits and a plurality of most significant bits, the 4 least significant bits of the counter value formed by a sequence number, the plurality of most significant bits of the counter value formed by a hyper frame number, wherein the MAC is configured to permit authentication of the super message using a public key and to protect confidentiality of a permanent user identity (IMSI) of each of the plurality of receiving entities; and
    transmitting, to the plurality of receiving entities, the 4 least significant bits of the counter value to be used for authenticating the super message.

2. The method according to claim 1, further comprising:
    transmitting the super message in conjunction with the MAC to the plurality of receiving entities.

3. The method according to claim 1, further comprising:
    transmitting the public key to the plurality of receiving entities using an integrity protected message.

4. The method according to claim 1, further comprising:
    transmitting the public key to the plurality of receiving entities using a ciphered message.

5. The method according to claim 1, further comprising:
    associating the counter value with a timing reference.

6. The method according to claim 1, further comprising:
    associating the counter value with a system frame number (SFN).

7. A method for providing message protection, the method comprising:
    receiving, in a receiving entity, a first data block from a transmitting entity, wherein the first data block comprises a first message authentication code (MAC), a second data block and only 4 least significant bits of a first counter value, the first counter value corresponding to the first data block and comprising a hyper frame number and a sequence number, wherein the 4 least significant bits of the first counter value correspond only to the sequence number, wherein 28 most significant bits of the counter value correspond only to the hyper frame number, and wherein the first MAC is configured to protect confidentiality of a permanent user identity (IMSI) of the receiving entity;
    generating a second MAC based upon least significant bits of a second counter value stored in the receiving entity, an integrity protection key, and the second data block;
    comparing the second MAC with the first MAC; and
    requesting retransmission of the second data block if the second MAC does not correspond to the first MAC.

8. The method according to claim 7, further comprising:
    receiving a sequence number in the receiving entity that corresponds to the second data block and to the 4 least significant bits of the first counter value.

9. The method according to claim 7, wherein the first data block further comprises a sequence number corresponding to the second data block and to the least significant bits of the second counter value.

10. The method according to claim 7, wherein the transmitting entity comprises a nodeB.

11. The method according to claim 7, wherein the transmitting entity comprises a user equipment (UE).

12. A method for providing message protection, the method comprising:
    generating a message authentication code (MAC) based upon a counter value, an integrity protection key, and a first data block, wherein the counter value comprises 4 least significant bits and a plurality of most significant bits, the 4 least significant bits of the counter value formed by a sequence number, the plurality of most significant bits of the counter value formed by a hyper frame number;

transmitting, to a receiving entity, the 4 least significant bits of the counter value to be used for authenticating a second data block;

generating the second data block that is integrity protected, wherein the second data block comprises the MAC and the first data block, wherein the MAC is configured to permit a request for retransmission of the second data block upon detection of unsuccessful reception of the second data block at the receiving entity using the 4 least significant bits of the counter value and to protect confidentiality of a permanent user identity (IMSI) of the receiving entity; and transmitting the second data block to the receiving entity without using a cyclic redundancy code (CRC) with the second data block.

13. The method according to claim 12, further comprising:
transmitting a sequence number to the receiving entity, wherein the sequence number corresponds to the first data block and to the 4 least significant bits of the counter value.

14. The method according to claim 12, wherein generating the second data block comprises:
including a sequence number in the second data block, wherein the sequence number corresponds to the first data block and to the 4 least significant bits of the counter value.

15. The method according to claim 12, wherein the transmitting is performed by a nodeB and the receiving entity comprises a user equipment (UE).

16. The method according to claim 12, wherein the transmitting is performed by a user equipment (UE) and the receiving entity comprises a nodeB.

17. A method for authenticating messages in a communication network, the method comprising:
receiving a public key in a first message from a first transmitting entity; and
authenticating a second message received from a second transmitting entity based upon the first message, the public key, an authentication algorithm, and only 4 least significant bits of a counter value that comprises a hyper frame number and a sequence number, wherein the 4 least significant bits of the counter value correspond only to the sequence number, and wherein 28 most significant bits of the counter value correspond to the hyper frame number, wherein the public key and the second message are for protecting confidentiality of a permanent user identity (IMSI) of a receiving entity.

18. The method according to claim 17, wherein authenticating the second message is further based upon a timing offset set between respective time references of the first transmitting entity and the second transmitting entity.

19. The method according to claim 17, further comprising:
receiving a cell-specific code from the first transmitting entity which identifies the second transmitting entity, and wherein authenticating the second message is further based upon the cell-specific code.

20. A method for authenticating messages in a communication network, the method comprising:
receiving at least one broadcast message;
receiving a public key in a secure message;
receiving a message authentication code (MAC);
receiving only 4 least significant bits of a counter value that comprises a hyper frame number and a sequence number, wherein the 4 least significant bits of the counter value correspond only to the sequence number, and wherein 28 most significant bits of the counter value correspond only to the hyper frame number;
defining the 4 least significant bits of the counter value as a time difference between reception of the MAC and a timing reference; and
authenticating the MAC using the 4 least significant bits of the counter value, the at least one broadcast message, an authentication algorithm, and the public key,
wherein the public key and the MAC are for protecting confidentiality of a permanent user identity (IMSI) of a receiving entity.

21. The method according to claim 20, wherein the secure message is integrity protected.

22. The method according to claim 20, wherein the secure message is ciphered.

23. The method according to claim 20, wherein the 4 least significant bits of the counter value are associated with a system frame number (SFN).

24. The method according to claim 20, wherein the at least one broadcast message is a multimedia broadcast multicast service (MBMS) message.

25. The method according to claim 20, wherein the at least one broadcast message is a system information message.

\* \* \* \* \*